(12) United States Patent
Lay et al.

(10) Patent No.: US 8,566,519 B2
(45) Date of Patent: Oct. 22, 2013

(54) PROVIDING PREFERRED SEED DATA FOR SEEDING A DATA DEDUPLICATING STORAGE SYSTEM

(75) Inventors: Matthew Russell Lay, Bristol (GB); Simon Pelly, Bristol (GB); Rothery Wyndham Harris, Bristol (GB)

(73) Assignee: Hewlett-Packard Development Company, L.P., Houston, TX (US)

( * ) Notice: Subject to any disclaimer, the term of this patent is extended or adjusted under 35 U.S.C. 154(b) by 171 days.

(21) Appl. No.: 12/833,594

(22) Filed: Jul. 9, 2010

(65) Prior Publication Data

US 2011/0010498 A1  Jan. 13, 2011

(30) Foreign Application Priority Data

Jul. 10, 2009  (GB) .................................. 0912012.2

(51) Int. Cl.
  *G06F 12/00*  (2006.01)
(52) U.S. Cl.
  USPC ............. 711/114; 711/E12.069; 711/E12.017
(58) Field of Classification Search
  USPC ........................................................ 711/162
  See application file for complete search history.

(56) References Cited

U.S. PATENT DOCUMENTS

2009/0177855 A1  7/2009  Drews et al.
2009/0182789 A1  7/2009  Sandorfi et al.

FOREIGN PATENT DOCUMENTS

| EP | 2012235 | 1/2009 |
|---|---|---|
| WO | WO2009/026028 | 2/2009 |
| WO | WO2009/054828 | 4/2009 |

OTHER PUBLICATIONS

UK Patent Office, Search and Examination Report regarding Application No. GB0912012.2, Hewlett-Packard Development Company, L.P., Oct. 21, 2009, 6 pages.
OA GB0912012.2, Aug. 5, 2010, 7 pages.

*Primary Examiner* — Reginald Bragdon
*Assistant Examiner* — Hamdy S Ahmed

(57) ABSTRACT

There is disclosed a computer system operable to process a plurality of logical storage unit manifests the manifests comprising respective pluralities of chunk identifiers identifying data chunks in a deduplicated data chunk store The computer system can determine at least one preferred manifest or preferred combination of manifests according to levels of duplication of the chunk identifiers within respective said manifests, and/or within respective combinations of said manifests. The computer system can provide preferred seed data corresponding to data chunks identified by the at least one preferred manifest or preferred combination of manifests. A method and computer readable medium are also disclosed. At least some embodiments facilitate timely and convenient transfer and storage of relevant data chunks to a receiving deduplicated data chunk store of a data storage system.

20 Claims, 9 Drawing Sheets

FIG. 7a

| | | |
|---|---|---|
| 710 — ABBDN | 4 | 5 |
| 711 — AEIONS | 6 | 6 |
| 712 — BCFRGGMC | 6 | 8 |
| 713 — AROCFGIISN | 9 | 10 ✓ |
| 714 — AERHEPIFIB | 7 | 10 |
| 715 — BRGSDN | 6 | 6 |
| 716 — EOLMEMIS | 6 | 7 |
| 717 — DDNSIT | 5 | 6 |
| 718 — EL | 2 | 2 |
| 719 — LFEB | 4 | 4 |

(columns 720, 721)

FIG. 7b

| | 720 | 721 |
|---|---|---|
| AROCFGIISN+ABBND | 11 | 15 |
| AROCFGIISN+AEIONS | 10 | 16 |
| AROCFGIISN+BCFRGGHC | 11 | 18 |
| - | - | - |
| AROCFGIISN+AERHEPIFIB | 12 | 20 |
| AROCFGIISN+BRGSDN | 11 | 16 |
| AROCFGIISN+EOLMEMIS | 12 | 17 |
| AROCFGIISN+DDNSIT | 11 | 16 |
| AROCFGIISN+EL | 11 | 12 |
| 713 — AROCFGIISN+LFEB — 719 | 12 | 14 ✓ |

FIG. 7c

| | 720 | 721 |
|---|---|---|
| AROCFGIISN+LFEB + ABBND | 13 | 19 |
| ~~AROCFGIISN+LFEB + AEIONS~~ | ~~12~~ | ~~20~~ |
| AROCFGIISN+LFEB + BCFRGGHC | 13 | 22 |
| - | - | - |
| AROCFGIISN+LFEB + AERHEPIFIB | 13 | 24 |
| AROCFGIISN+LFEB + BRGSDN | 13 | 20 |
| AROCFGIISN+LFEB + EOLMEMIS | 13 | 21 |
| 713 — AROCFGIISN+LFEB + DDNSIT | 14 | 20 ✓ |
| ~~AROCFGIISN+LFEB + EL~~ | ~~12~~ | ~~16~~ |
| - | - | - |

(labels 719, 718, 717, 711)

|  | 920 | 921 | 922 |
|---|---|---|---|
| 910 — ABBDN | 4 | 5 | 0.800 |
| 911 — AEIOON | 5 | 6 | 0.833 |
| 912 — BCFFGCM | 5 | 7 | 0.714 |
| 913 — AFCCGNIIC | 6 | 9 | 0.666 |
| 914 — AERHEFEIB | 7 | 9 | 0.777 |
| 915 — BRG | 3 | 3 | 1.000 |
| 916 — LMEMIS | 5 | 6 | 0.833 |
| 917 — DDNS | 3 | 4 | 0.750 |
| 918 — EL | 2 | 2 | 1.000 |
| 919 — LFEB | 4 | 4 | 1.000 ✓ |

*FIG. 9a*

|  | 920 | 921 | 922 |
|---|---|---|---|
| LFEB+ABBDN | 7 | 9 | 0.777 |
| LFEB+AEIOON | 8 | 10 | 0.800 |
| LFEB+BCFFGCH | 7 | 11 | 0.636 |
| LFEB+AFCCGNIIC | 9 | 13 | 0.692 |
| LFEB+AREHEFEIEB | 8 | 13 | 0.615 |
| LFEB+BRG | 6 | 7 | 0.857 |
| LFEB+LMEMIS | 7 | 10 | 0.700 |
| 919 — LFEB+DDNS ～917 | 7 | 8 | 0.875 ✓ |
| ~~LFEB+EL~~ | ~~4~~ | ~~6~~ | ~~0.666~~ |
| - | - | - | - |

*FIG. 9b*

|  | 920 | 921 | 922 |
|---|---|---|---|
| LFEB+DDNS+ABBDN | 8 | 13 | 0.615 |
| LFEB+DDNS+AEIOON | 10 | 14 | 0.714 |
| LFEB+DDNS+BCFFGCH | 10 | 15 | 0.666 |
| LFEB+DDNS+AFCCGNIIC | 11 | 17 | 0.647 |
| LFEB+DDNS+AREHEFEIEB | 12 | 17 | 0.705 |
| 919 — LFEB+DDNS+BRG ～915 | 9 | 11 | 0.818 ✓ |
| LFEB+DDNS+LMEMIS | 9 | 14 | 0.642 |
| - 917 | - | - | - |
| ~~LFEB+DDNS+EL~~ | ~~7~~ | ~~10~~ | ~~0.700~~ |
| - | - | - | - |

*FIG. 9c*

PROVIDING PREFERRED SEED DATA FOR SEEDING A DATA DEDUPLICATING STORAGE SYSTEM

BACKGROUND

It is known to replicate data from a first data storage system to a second data storage system, the second data storage system being located remotely from the first data storage system. For example, the first data storage system might provide backup, or secondary, storage for one or more host computer systems, and the second data storage system might enable data backed up to the first data storage system to be recovered to a known state in the event that data stored on the first data storage system becomes unavailable. Where the replicated data is not required to be available for immediate online restore purposes, the expense of providing fast (high bandwidth) communication links to remote sites can render replicating between the first and second data storage systems over a fast communications link uneconomical compared to known alternative methods such as the transportation of data on removable storage between sites. Therefore, slower (lower bandwidth), less expensive, communications links are sometimes used for replication, whereby the time taken to replicate a specified set of data is longer, and is generally planned to be effected within predetermined time limits, for example within eight or twenty-four hours.

Where both first and second data storage systems employ data deduplication technology, then following an initial replication session, if subsequent replication sessions contain similar data with relatively few changes, as is often the case for example with backup data, then the subsequent replication can be performed more efficiently in that only previously un-replicated data needs to be communicated over the slower link, and previously replicated data can merely be identified over the link using a small-footprint chunk identifier. However, in a situation, for example, in which data on one of the first and second data storage systems becomes unavailable, it can take an undesirably long time to replicate the data from the remaining available data storage system to a replacement data storage system over the slower communications link because the deduplicated data store of the replacement data storage system will be empty. A similar situation exists when initially replicating to a replication target.

BRIEF DESCRIPTION OF THE DRAWINGS

In order that the invention may be well understood, various embodiments thereof will now be described, by way of example only, with reference to the accompanying drawings, in which:

FIGS. 7a, 7b and 7c illustrate conceptually a method of determining at least one preferred manifest or preferred combination of manifests;

FIGS. 9a, 9b and 9c illustrate conceptually an alternative method of determining at least one preferred manifest or preferred combination of manifests.

DETAILED DESCRIPTION

Figure 1:
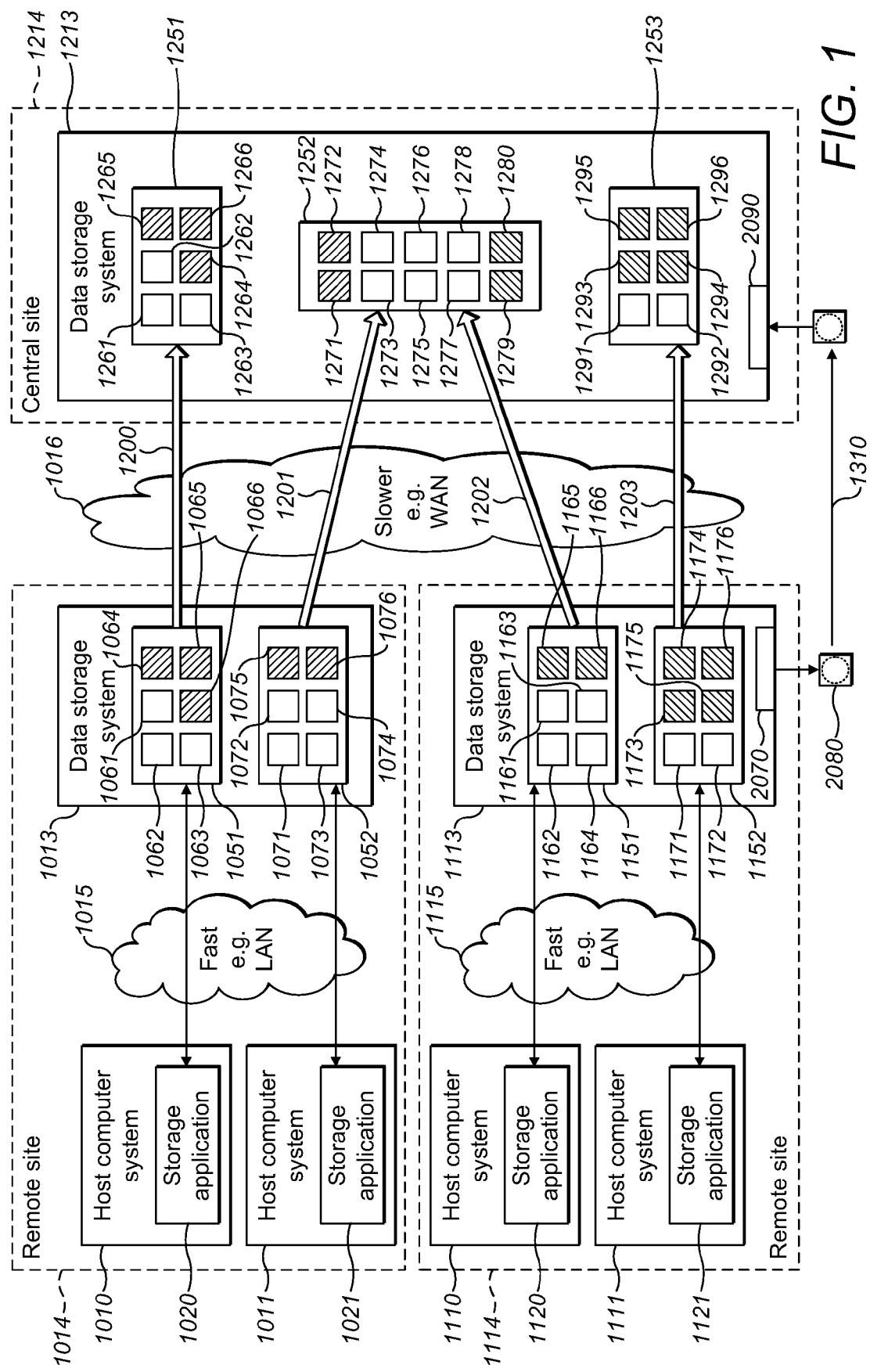
FIG. 1 shows an arrangement in which data in collections of logical storage units, stored on respective data storage systems, is replicated from remote sites across a relatively slow network.

FIG. 1 shows host computer systems 1010, 1011 and a data storage system 1013 located at a satellite data site 1014. The host computer systems 1010, 1011 are connected to the data storage system 1013 across a relatively fast (relatively high bandwidth) network 1015. A further data storage system 1213 is located at a central data site 1214 remote from the satellite data site 1014, for example geographically sufficiently remote from the satellite data site to provide a degree of isolation from effects of possible disaster scenarios that might occur at the satellite data site 1014. A further remotely located satellite data site 1114 is shown at which further host computer systems 1110, 1111 and a further data storage system 1113 are located. The host computer systems 1110, 1111 are connected to the data storage system 1013 across a relatively fast (high bandwidth) network 1115.

Figure 3:
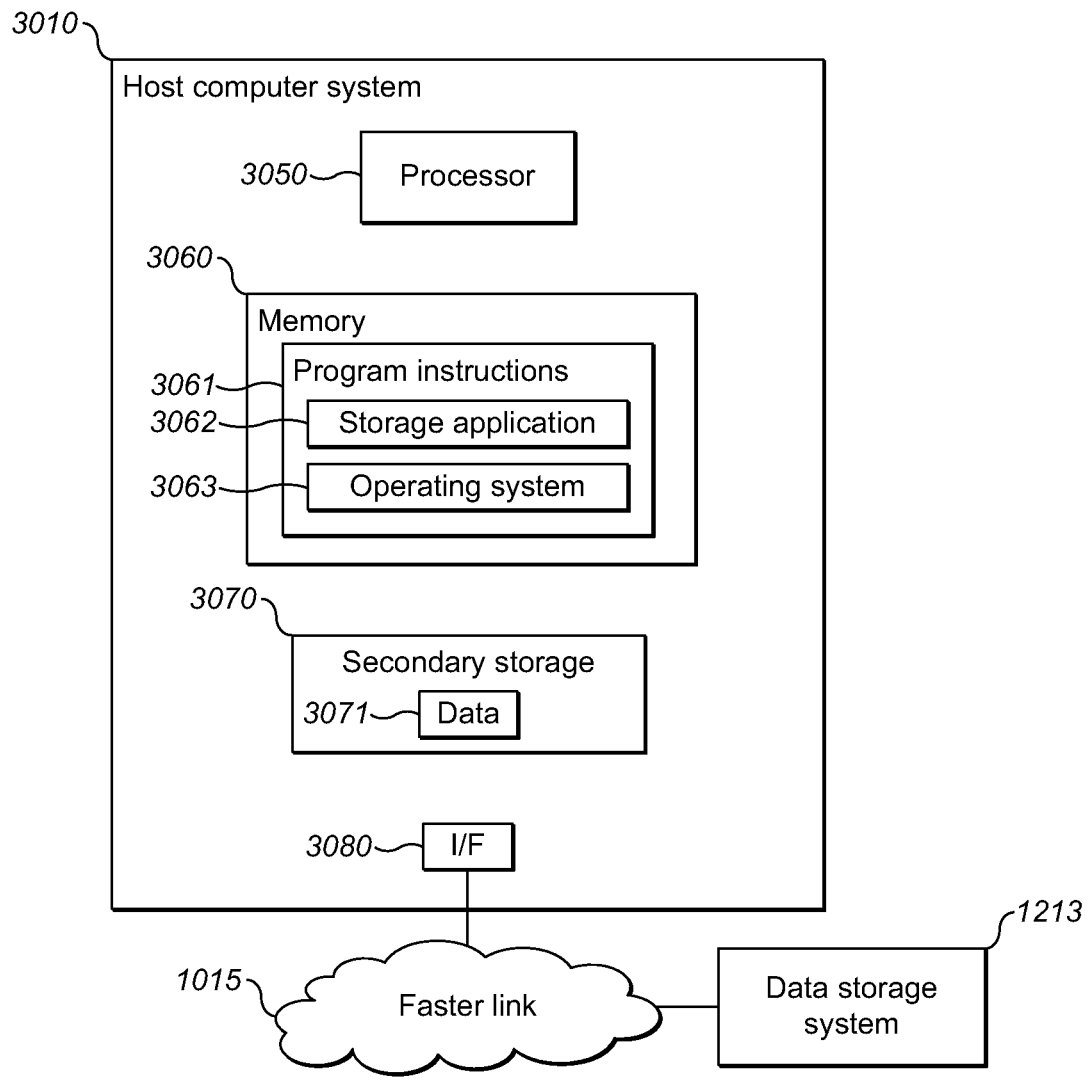
FIG. 3 shows further detail of a host computer system shown in FIG. 1.

At least some of the host computer systems 1010, 1011, 1110, 1111 execute respective storage applications 1020, 1021, 1120, 1121, and can, for example, take the form of the exemplary host computer system 3010 shown in FIG. 3. The host computer system 3010 comprises data processing apparatus including a computer processor 3050 and a computer readable medium in the form of memory 3060, for example DRAM or any other convenient form of fast direct access memory. The memory 3060 has stored thereon computer program instructions 3061, including storage application program instructions 3062 and an operating system 3063, executable on the processor 3050. The storage application program instructions can be executed by the processor 3050 to provide a storage application. For example, the storage application can take the form of a backup application such as HP Data Protector or any other suitable application, that, such as a pointer to a location in the chunk store 4021 (FIG. 4), accesses data 3071 from the host computer system 1010 and/or other computer systems and transforms the accessed data into a form suitable for transmitting to a target backup data storage system 1013, 1113, 1213. The operating system 3063 comprises, for example, a Linux, UNIX or OS-X based operating system, Microsoft Windows operating system, or any other suitable operating system.

The host computer system 3010 also includes secondary storage 3070 having user data 3071 stored thereon. The secondary storage 3070 may have slower access than the memory 3060, and conveniently comprises a hard disk drive enclosure, or any other convenient form of mass storage. The exemplary host computer system 3010 comprises an industry standard server having the secondary storage 3070 located within the server enclosure. Alternatively, the host computer system 3010 can include, for example, a blade server, and the secondary storage 3070 can be located separately to the server enclosure, or the host computer system 3010 can be any other convenient form of computer system.

The host computer system 3010 also includes a communications interface 3080 for communicating with a fast network 1015, 1115. The fast network 1015, 1115 can, for example, comprise one or more local area networks (LANs) using, for example, Gigabit Ethernet technology or any other suitable LAN technology. The communications interface 3080 can comprise, for example, a host bus adapter (HBA) using iSCSI over Ethernet or Fibre Channel protocols for handling backup data in a tape data storage format, a NIC using NFS or CIFS network file system protocols for handling backup data in a NAS file system data storage format, or any other convenient type of interface.

Figure 2:
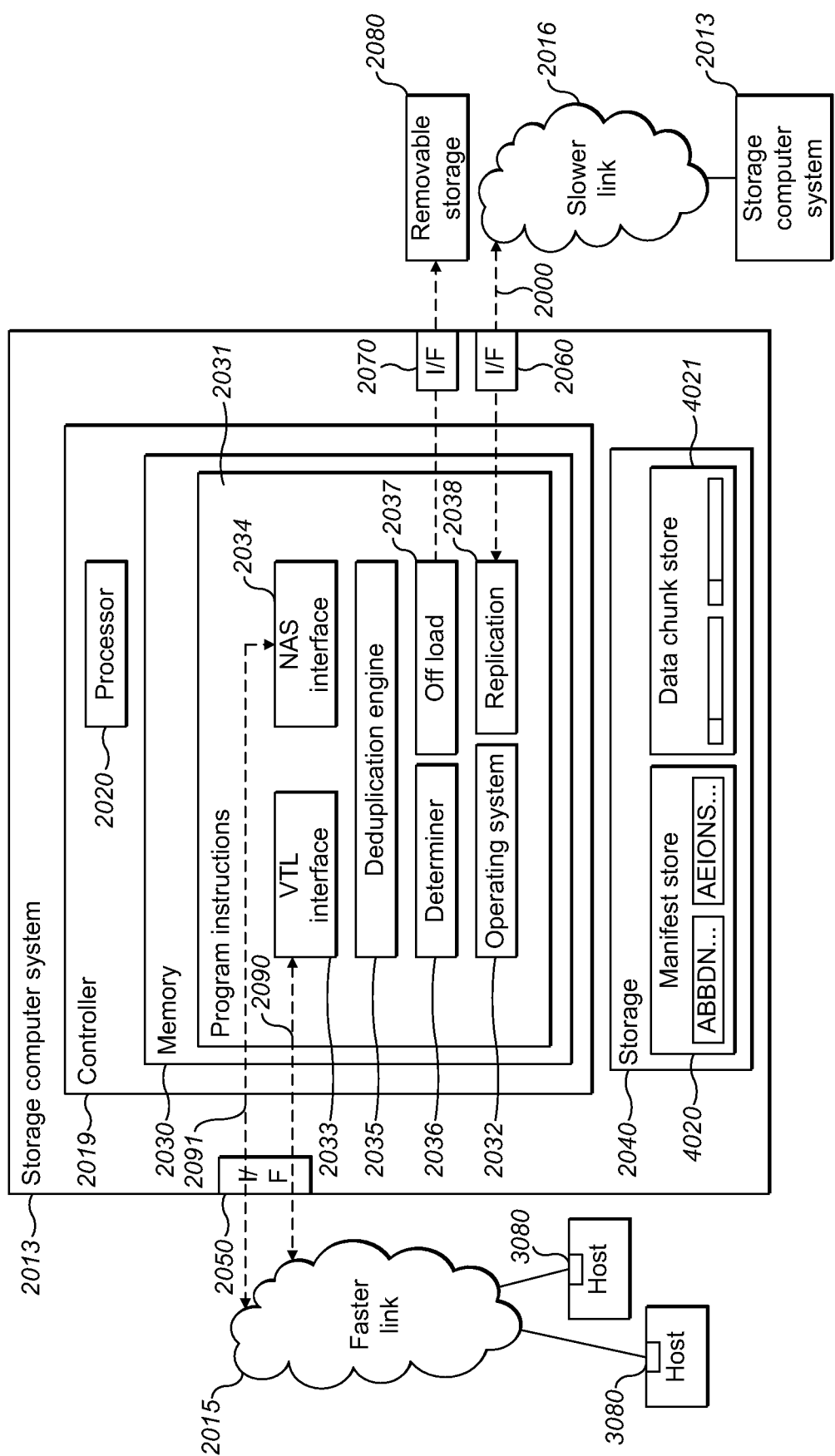
FIG. 2 shows further detail of an exemplary data storage system shown in FIG. 1, including a deduplication engine, a deduplicated data chunk store and a manifest store containing manifests of data identifiers.

The data storage systems 1013, 1113, 1213 can take the form of the exemplary data storage system 2013 illustrated in FIG. 2. Data storage system 2013 comprises data processing apparatus in the form of a controller 2019 having a processor 2020 and a computer readable medium 2030 in the form of a memory. The memory 2030 can comprise, for example, DRAM or any other convenient form of fast direct access memory. During use of the data storage system 2013, the memory 2030 has stored thereon computer program instructions 2031 executable on the processor 2020, including an operating system 2032 comprising, for example, a Linux, UNIX or OS-X based operating system, Microsoft Windows operating system, or any other suitable operating system. The data storage system 2013 also includes a communications interface 2050 for communicating with a fast (relatively high bandwidth) network 2015, a further communications interface 2060 for communicating with a relatively slow (relatively low bandwidth) network 2016, and a still further communications interface 2070 for communicating with removable storage 2080.

The data storage system 2013 also includes secondary storage 2040. The secondary storage 2040 may provide slower access speeds than the memory 2030, and conveniently comprises hard disk drives, or any other convenient form of mass storage. The hardware of the exemplary data storage system 2013 can, for example, be based on an industry-standard server. The secondary storage 2040 can located in an enclosure together with the data processing apparatus 2020, 2030, or separately.

The data storage systems 1013, 1113 at the satellite sites 1014, 1114 can communicate with the data storage system 1213 at the central site 1214 to replicate data over a relatively slow (low bandwidth) network 1016, using interfaces such as the interface 2060 shown in FIG. 2. The network 1016 can, for example, be any convenient form of wide area network (WAN), and can provide, for example, link speeds from about 2 Mbits/sec to about 50 Mbits/sec or more. The selection of a satisfactory link speed for low bandwidth replication will depend on the amount of data to be replicated in a time that is acceptable to a system manager, and whether the link is dedicated to replication or shared with other inter site communications. Generally, other factors being equal, procuring a lower speed link will result in lower costs than sharing a higher speed link. The WAN link may span, for example, a few kilometres, more than 30 kilometres to mitigate some disaster scenarios such as earthquakes, and up to several thousand kilometres depending on latency of the link. The communications interface 2060 can, for example, comprise a network interface card (NIC), and communication can be over TCP/IP socket connections using any suitable message protocol, for example a message protocol proprietary to the manufacturer of the data storage system 2013, for communication between the data storage system 2013 and another data storage system 2013 connected to the WAN 2016.

A fast link 2015 can be formed between the communications interface 2050 and a host communications interface 3080 over a fast (high bandwidth) network 1015, 1115, for example comprising a Gigabit Ethernet LAN or any other suitable LAN technology. The communications interface 2050 can comprise, for example, a host bus adapter (HBA) using iSCSI over Ethernet or Fibre Channel protocols for handling backup data in a tape data storage format, a NIC using NFS or CIFS network file system protocols for handling backup data in a NAS file system data storage format, or any other convenient type of interface.

The communications interface 2070 can comprise a HBA for communication with a removable storage device for transferring data to removable storage. The removable storage device can comprise, for example, a tape drive, optical disk drive, flash memory, or any other convenient type of removable storage device. The HBA can communicate with the removable storage device using, for example, Serial Attached SCSI (SAS), USB, Fibre Channel, SCSI or any other convenient protocol appropriate for the removable storage device.

The program instructions 2031 also include modules that, when executed by the processor 2020, respectively provide a virtual tape library (VTL) interface 2033, a NAS storage interface 2034, a data deduplication engine 2035, a determiner 2036, an offloader 2037 and a replication engine 2038, as described in further detail below.

The virtual tape library (VTL) interface 2033 is operable to emulate at least one physical tape library, facilitating that existing storage applications, designed to interact with physical tape libraries, can communicate with the interface 2033 without significant adaptation, and that personnel managing host data backups can maintain current procedures after a physical tape library is changed for a VTL. A communications path can be established between a storage application 1020, 1021, 1120, 1121 and the VTL interface 2033 using the interfaces 2050, 3080 and a fast network 1015, 1115, 2015. A part 2090 of the communications path between the VTL interface 2033 and the network 1015, 1115, 2015 is illustrated in FIG. 2. The VTL user interface 2033 can receive a stream of data in a tape data storage format from a host storage application 1020, 1021, 1120 1121 storage session, for example a backup session, and can pass data back to a host in response to usual tape storage application command protocols. The VTL user interface 2033 also generates a graphical user interface (GUI) that can be viewed on a presentation resource, such has a display device, of a computer system connected to the data storage system 2013 in any convenient manner, for example using a web browser connected across a fast network 1015, 1115 using the interface 2050.

The data storage systems 1013, 1113, 1213 shown in FIG. 1 are each configured, using the VTL user interface 2033, to provide a plurality of virtual libraries 1051, 1052, 1151, 1152, 1251, 1252, 1253. Each virtual library comprises a configurable collection of virtual slots 1061 to 1066, 1071 to 1076, 1161 to 1166, 1171 to 1176, 1261 to 1266, 1271 to 1280, 1291 to 1296 and logical storage units in the form of virtual tape cartridges. Virtual tape cartridges are shown, represented by crosshatching, in slots 1064 to 1066, 1075, 1076, 1271, 1272, 1279, 1280, and 1293 to 1296.

Slots in the virtual libraries 1051, 1052, 1151, 1152 of the remote site data storage systems 1013, 1113 are mapped to slots in the virtual libraries 1251, 1252, 1253 at the central site 1214. As shown in FIG. 1, slots in the virtual library 1051 map directly to slots in virtual library 1251 and slots in virtual library 1152 map directly to slots in the virtual library 1253. Some of the slots from virtual libraries 1052 and 1151 map into virtual library 1252. The slot mappings are user configurable, and the slots, cartridges and virtual libraries can be presented by the GUI in any convenient manner.

The replication engine 2038 is operable to control transmission of data stored on a virtual tape cartridge over the interface 2060 and a relatively low bandwidth network link, for receipt by a virtual tape library of a further data storage system. For example, in FIG. 1, virtual tape libraries 1051, 1052, 1151, 1152 at remote sites 1014, 1114 are configured as replication sources, and virtual tape libraries 1251, 1252, 1253 at the central site 1214 are configured as replication targets, for replication of virtual tape cartridges as indicated by arrows 1200, 1201, 1202, 1203 and 1200. Such an arrangement can conveniently be employed, for example, to replicate backed up data to the central site 1214 for disaster recovery purposes. The data storage systems 1013, 1113, 1213, 2013 each permit configuration of virtual tape libraries as one of a replication source and a replication target. For example, to perform restore operations by replicating virtual tape cartridges from a virtual tape library 1251, 1252 1253 at the central site 1214 to a new virtual tape library on, for example, a replacement data storage system 2013 at a remote site 1014, 1114, the central virtual tape library required to perform restore is reconfigured as a replication source, and the new virtual tape library is configured as a replication target.

The program instructions 2031 also include a module that, when executed by the processor 2020, provides a network attached storage (NAS) interface 2034. The NAS user interface 2034 can be provided in addition to or as an alternative to the VTL user interface 2033. A communications path can be established between a storage application 1020, 1021, 1120, 1121 and the NAS interface 2034 using the interfaces 2050, 3080 and a fast network 1015, 1115, 2015. A part 2091 of the communications path between the NAS interface 2034 and the network 1015, 1115, 2015 is illustrated in FIG. 2. The NAS user interface 2034 presents a shared file system to the host storage application. Data storage systems 1013, 1113, 1213 can be configured to provide a desired arrangement of file shares (not shown). Each file share can comprise a collection of logical storage units in the form of files (not shown). Each file can, for example, relate to a relatively large backup session file provided by a backup application. In the present embodiment, replication source file shares are mapped to replication target file shares on a one-to-one basis.

Figure 4:
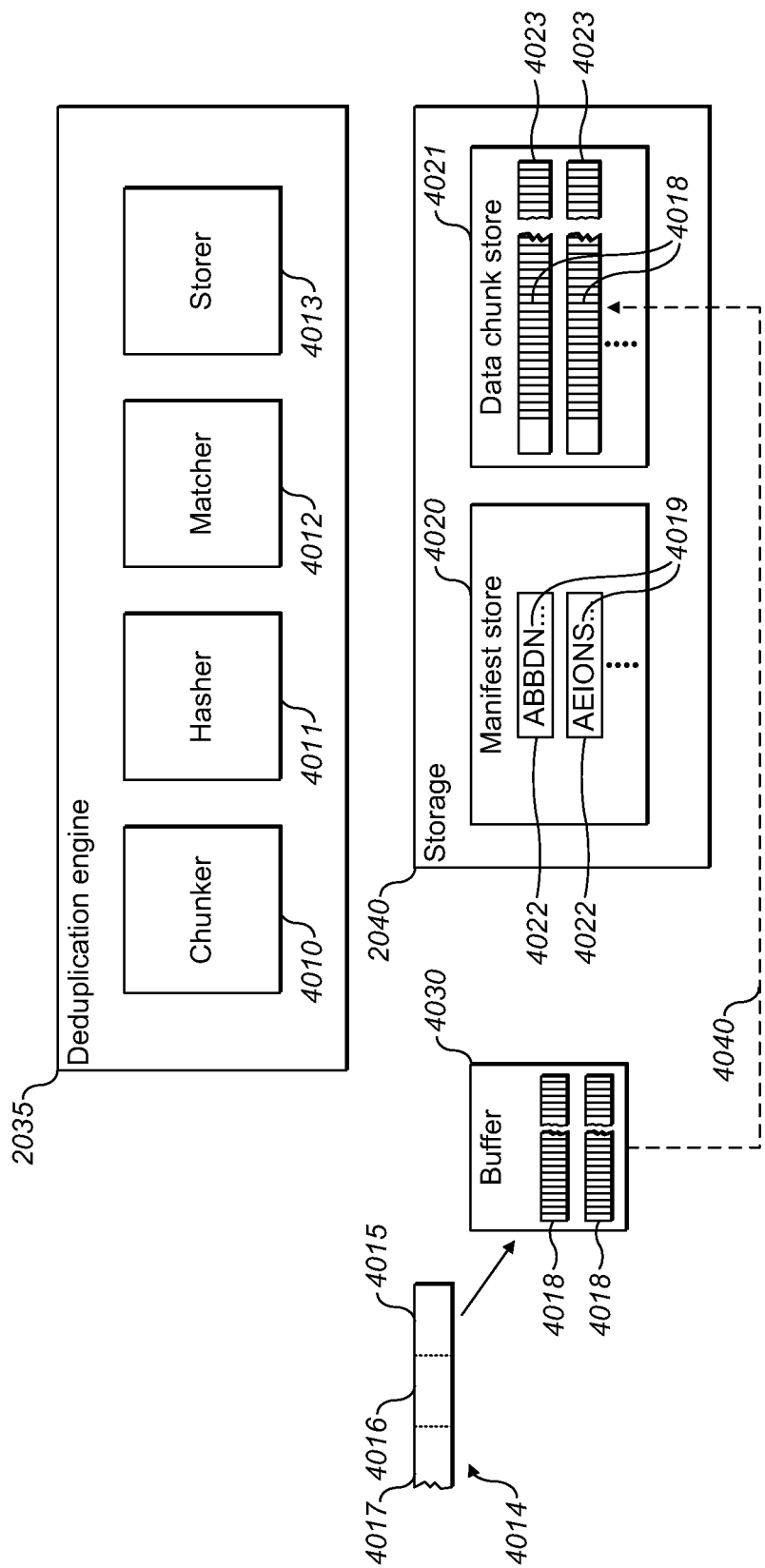
FIG. 4 shows further details of the deduplication engine.

Referring to FIGS. 2 and 4, the deduplication engine 2035 includes functional modules comprising a chunker 4010, a chunk identifier generator in the form of a hasher 4011, a matcher 4012, and a storer 4013, as described in further detail below. The VTL user interface 2033 and the NAS user interface 2034 can pass data to the deduplication engine 2035 for deduplication and storage. In one exemplary embodiment, a data buffer 4030, for example a ring buffer, controlled by the deduplication engine 2035, receives data 4014 from the VTL or NAS user interface 2033 or 2034. The data 4014 can conveniently be divided by the deduplication engine 2035 into data segments 4015, 4016, 4017 for processing. The segments 4015, 4016, 4017 can be relatively large, for example, between 5 and 50 Mbytes, say about 10 MBytes, or any other convenient size. The segments can be of variable size, within thresholds, segment boundaries being selected according to characteristics of the data. Alternatively, fixed sized segments may be selected, or any other convenient segment selection process may be employed. The chunker 4010 examines data in the buffer 4030 and identifies data chunks 4018 of a convenient size for processing by the deduplication engine 2035. The chunks 4018 may, for example, be of variable size, within thresholds, the chunk boundaries being selected according to characteristics of the data, and have an average size, for example, of approximately 4 KBytes, or any other convenient size. Alternatively, fixed sized chunks may be selected, and/or the boundaries of the data chunks may be coterminous with file boundaries, or any other convenient chunk selection process may be employed.

The hasher 4011 is operable to process a data chunk 4018 using a hash function that returns a number, or hash, that can be used as a chunk identifier 4019 to identify the chunk 4013. The chunk identifiers 4019 are stored in manifests 4022 in a manifest store 4020 in secondary storage 2040. Each manifest 4022 comprises a plurality of chunk identifiers 4019. Conveniently, the chunk identifiers 4019 corresponding to the chunks 4018 in a segment 4015, 4016, 4017 can be stored together in a chunk identifier portion (not shown), each manifest 4022 comprising one or more of the portions. The portions can be relatively large, say about 10 MBytes or any other convenient size, and a manifest can comprise tens or hundreds of portions. The term "hash function" is to be understood to refer to any well-defined procedure, mathematical function, or deterministic function that converts a large, possibly variable sized amount of data into a small datum. The hash function is selected such that the possibility of two data chunks producing the same hash, or colliding, is statistically extremely small for the purposes of deduplication. One exemplary suitable hash function is the SHA-1 hash function. The chunk identifiers 4019 are represented in FIGS. 2 and 4 by respective letters, identical letters denoting identical chunk identifiers 4019.

The matcher 4012 is operable to attempt to establish whether a data chunk 4018 in a newly arrived segment 4015 is identical to a previously processed and stored data chunk. This can be done in any convenient manner. In one exemplary embodiment, a sparse index is maintained in memory 2030, comprising hooks in the form of chunk identifiers 4019 selected according to a predetermined criterion, for example using a characteristic of the data, such as that the selected identifiers 4019 have the value 0 for all their most significant n bits, where n is a predetermined number, or using any other convenient criterion. Depending on the results of a comparison between chunk identifiers 4019 in a received segment 4015 and the hooks in the sparse index, selected manifest portions that appear to potentially have the most chunks in common with the data segments to be processed are loaded from the manifest store 4020 into memory 2030, and a comparison made between each chunk identifier 4019 in the newly arrived segment 4015 and the respective chunk identifiers in the selected manifest portions.

If no match is found for a data chunk 4018 of a segment 4015, the storer 4013 will store 4040 the corresponding unmatched data chunk 4018 from the buffer 4030 to a deduplicated data chunk store 4021 in secondary storage 2040. Data chunks 4018 are conveniently stored in the data chunk store in relatively large containers 4023, having a size, for example, of say between 2 and 4 Mbytes, or any other convenient size. Meta data including a storage locator, such as a pointer to a location in the chunk store 4021, for a stored data chunk 4018 is stored in association with the unmatched chunk identifier 4019 in the manifest store 4020. It will be appreciated from the above that there might be some residual level of duplication of data chunks in the data chunk store 4021, and the terms deduplication and deduplicated should be understood in this context. Data chunks 4018 can be processed to compress the data if desired prior to saving to the chunk store 4021, for example using LZO or any other convenient compression algorithm.

If a match is found, the storer 4030 will not store the corresponding matched data chunk 4018, but will obtain, from the meta data stored in association with the matching chunk identifier, a storage locator for the matching data chunk. The obtained meta data is stored in association with the newly matched chunk identifier 4018 in a manifest 4022 in the manifest store 4020 in secondary storage 2040. Using a sparse index in a manner as described above reduces the amount of fast access memory required to perform matching of large numbers of chunk identifiers. However, it will be appreciated that the skilled person will be able to envisage many alternative ways in which to store and match the chunk identifiers and data chunks. If the cost of an increase in size of fast access memory is not a practical impediment, at least part of the manifest store and/or the data chunk store could be retained in fast access memory.

To replicate a logical storage unit such as a virtual tape cartridge or a file from a logical storage unit collection 1051, 1052, 1151, 1152 configured as a replication source, to a logical storage unit collection 1251, 1252, 1253 configured as a replication target, a replication engine 2038 of the source data storage system 1013, 1113 requests a deduplication engine 2035 of the source data storage system 1013, 1113 to provide from the data chunk store 4021 of the source data storage system a manifest 4022 corresponding to the logical storage unit to be replicated. The logical storage unit to be replicated is transmitted to the data storage system 1213 hosting the target logical storage collection, using source and target interfaces 2050, 2060 and the low bandwidth link 2016. A replication engine 2038 of the target data storage system 1213 requests a deduplication engine 2035 of the target data storage system 1213 to perform a matching operation using the transmitted manifest 4022 against selected manifest portions stored in the manifest store 4020 of the target logical storage unit collection of the target data storage system 1213, and to return a list of unmatched chunk identifiers 4019. The matching operation can, for example, use some similar operations to the matching of newly arrived segments described above. Following receipt of the list of unmatched identifiers, the source replication engine 2038 requests the source data deduplication engine 2035 to provide, from a chunk store 4021 of the source logical storage unit collection 1051, 1052, 1151, 1152, data chunks 4018 corresponding to the unmatched chunk identifiers 4019, and sends the data chunks 4018 to the target data storage system 1213. The target replication engine 2038 requests the target deduplication engine 2035 to store the received corresponding data chunks 4018 and the manifest to be replicated.

In this manner, efficient replication of logical storage units over the low bandwidth link 2016 is facilitated, as long as the chunk store 4021 of the target logical storage unit collection 1251, 1252, 1253 has sufficiently numerous and relevant data chunks 4018 and corresponding manifests of data identifiers 4019 stored thereon to provide a significant number of matches between received chunk identifiers and previously stored chunk identifiers. Also, backup data often contains large amounts of identical data arranged in a similar sequence to previous backup data. In some embodiments the order in which data chunks 4018, including data chunks appended in later backups, are stored in the containers 4023, and the selection of containers in which to store data chunks, including appended data chunks, is managed, for example to attempt to increase matching efficiency by reducing the number of containers that need to be accessed during anticipated future backup sessions. This can further facilitate efficient replication and deduplication of backup data.

There are occasions when a chunk store 4021 of a replication target virtual storage unit collection contains an insufficient number of relevant chunks 4018 to enable efficient replication of logical storage units over the low bandwidth link 2016. For example, when it is first decided to replicate backup data to a central site using a new replication target data storage system 1213, or following replacement of a failed source data storage system 1013, 1113 at a remote site 1014, 1114. The data storage systems 1013, 1113, 1213, 2013 facilitate the provision of seed data from logical storage units of one data storage system 1013, 1113, 1213, 2013 to another data storage system 1013, 1113, 1213, 2013 using removable storage 2080. In one exemplary embodiment, a user of the data storage system 2013, or a host computer system 1010, 1011, 1110, 1111 or another computer system connected to the data storage system 2013, is presented with an option to request generation of a list of at least one logical storage unit suitable for use as seed data, and/or to request generation of removable physical storage bearing suitable seed data.

Figure 6:
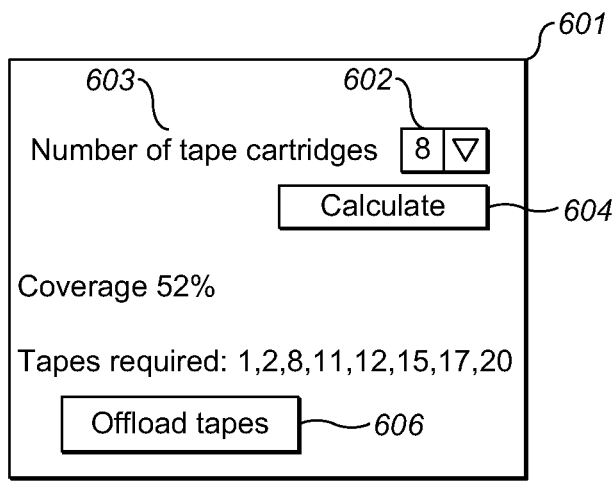

FIG. 6 shows an exemplary GUI arrangement 601 for use in a process of requesting the provision of removable storage, in the form of at least one physical tape cartridge, bearing preferred seed data. The GUI 601 is generated, for example, by the VTL user interface 2033. The GUI 601 has a drop-down box 602, or other mode of receiving numerical input, and a prompt 603 requesting user input into the box 602 of a desired number of virtual tape cartridges to be used to provide seed data. Where physical tape cartridges to be used as removable physical storage are permitted to have different characteristics, for example a different nominal capacity, from the virtual tape cartridges, additional or alternative options may be offered, for example to select the required capacity and/or number of physical tape cartridges. A user activatable object, for example a calculate button 604, is presented for the user to request to proceed using the present contents of the box 602.

In response to receiving a request to proceed from a user, the VTL user interface 2033 identifies the or each virtual tape cartridge manifest 4022 in the instant virtual tape library, and requests the determiner 2036 to process the or each manifest 4022 to determine at least one preferred manifest 4022 or preferred combination of manifests according to levels of duplication of the chunk identifiers 4019 within the respective manifests 4022 or combinations. By way of example, the determiner 2036 is operable to perform a method, illustrated conceptually in FIGS. 7a, 7b and 7c, for determining at least one preferred manifest or preferred combination of manifests.

FIG. 7a shows the contents of ten virtual tape cartridge manifests 710 to 719 of a virtual tape library. Data identifiers 4019 in the form of hashes are represented in the drawings by respective letters of the alphabet, identical letters representing identical hashes. For example, manifest 710 contains five hashes ABBDN. It will be appreciated that the figures are by way of conceptual illustration only, and that in practice each manifest may contain a large number of hashes, for example hundreds of thousands of hashes. The determiner 2036 is operable to perform a count of a number of mutually different chunk identifiers occurring within each respective manifest 710 to 719. The resulting value for each manifest 710 to 719 is shown in the non-duplicates column 720 of FIG. 7a. The determiner 2036 may also determine the number of hashes in each manifest, shown in the size column 721 of FIG. 7a.

The resulting values in the non-duplicates column 720 are compared and the manifest, in the example of FIG. 7a manifest 713, having the highest non-duplicate value is selected as the currently preferred manifest, indicated by a tick in FIG. 7a. In case of a draw between manifests having equal non-duplicate values, the drawing manifest with the lowest size value in column 721 is selected. In case of a further draw, the first listed of the drawn manifests is selected. If the currently preferred manifest represents a virtual tape cartridge satisfying the input requirements regarding the number and/or capacity of tape cartridges, the determiner 2036 reports the currently preferred manifest as the determined preferred manifest.

If the currently preferred manifest represents a virtual tape cartridge not satisfying the input requirements regarding the number and/or capacity of tape cartridges, the determiner 2036 uses manifest 713 as a root manifest, and combines this root manifest with each of the remaining manifests, as illustrated in FIG. 7b. The resulting combinations of manifests are processed in a similar manner to the processing of the individual manifests described above with a reference to FIG. 7a. That is, the resulting count values in the non-duplicates column 720 are compared and the manifest combination having the highest non-duplicates value, in example of FIG. 7b manifest combination 713+719, is selected as the currently preferred manifest combination, indicated by a tick in FIG. 7b. In case of a draw between manifests having equal non-duplicate values, the drawing manifest with the lowest size value in column 721 is selected. In case of a further draw, the first listed of the drawn manifests is selected. If the currently preferred manifest combination represents virtual tape cartridges satisfying the received data input relating to the desired number and/or capacity of tape cartridges, the determiner 2036 reports that manifest combination 713+719 as the determined preferred manifest combination.

If the currently preferred manifest combination represents virtual tape cartridges not satisfying the received data input relating to the desired number and/or capacity of tape cartridges, the determiner 2036 uses the currently preferred manifest combination 713+719 as a root, and combines this root with each of the remaining manifests, as illustrated in FIG. 7c. Any manifest which is a subset of the current root, for example manifest 711 and manifest 718 in FIG. 7c, is removed from the list. The resulting values in the non-duplicates column 720 are compared, and the remaining manifest combination having the highest non-duplicates value, in the example of FIG. 7c manifest combination 713+719+717, is selected as the currently preferred manifest combination, indicated by a tick in FIG. 7c. In case of a draw between manifest combinations having equal nonduplicate values, the drawing manifest combination with the lowest size value in column 721 is selected. In case of a further draw, the first listed of the drawn manifests is selected. If the currently preferred manifest combination represents virtual tape cartridges satisfying the requirements regarding the number and/or capacity of tape cartridges, the determiner 2036 reports manifest combination 713+719+717 to the VTL user interface as the determined preferred manifest combination.

If the currently preferred manifest combination represents virtual tape cartridges not satisfying the requirements regarding the number and/or capacity of tape cartridges, the determiner 2036 iterates the process described in the immediately preceding paragraph until the requirements regarding the number and/or capacity of tape cartridges are satisfied, and reports of the resulting manifest combination to the VTL user interface as the finally determined preferred manifest combination. The determiner 2036 also determines the number of non-duplicate hashes in the finally determined preferred manifest combination as a proportion of the number of non-duplicate hashes in all manifests 710 to 719 and reports these numbers and/or the proportion to the VTL user interface 2033. The VTL user interface presents the reported information to the user using the GUI 601. For example, in FIG. 6 the proportion is presented as coverage 52%, and a list is presented of tape cartridge identifiers, for example barcode numbers, of the virtual tape cartridges corresponding to the manifests in the finally determined preferred combination of manifests.

Figure 5:
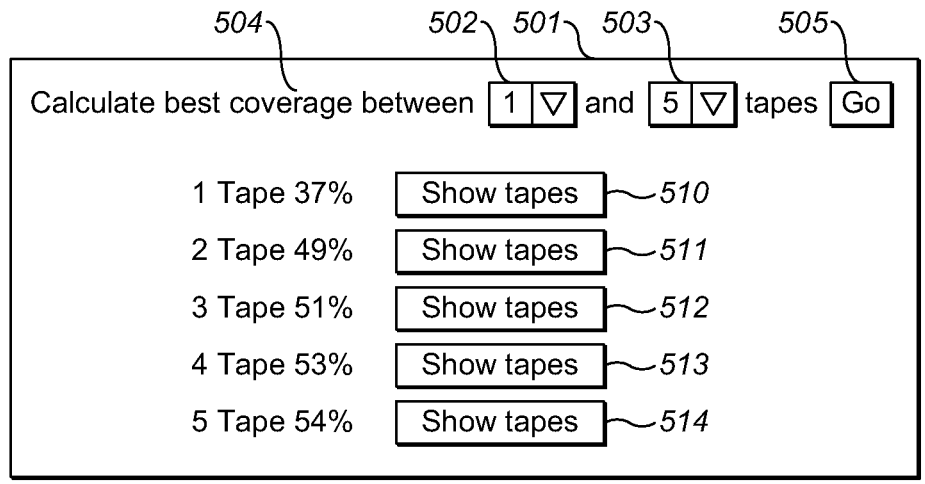
FIGS. 5 and 6 show exemplary GUIs for requesting provision of removable storage, in the form of at least one physical tape cartridge, bearing preferred seed data.

FIG. 5 shows an alternative exemplary GUI 501 arrangement for requesting the provision of removable storage, in the form of at least one physical tape cartridge, bearing preferred seed data. The GUI 501 is generated, for example, by the VTL user interface 2033. The GUI 601 drop-down boxes 502, 503, or other mode of receiving numerical input, and a prompt 504 requesting user input into the boxes 502, 503 of a desired number, or range of alternative numbers, of virtual tape cartridges to be used to provide seed data. Where physical tape cartridges to be used as removable physical storage may have different characteristics, for example a different nominal capacity, from the virtual tape cartridges, additional or alternative options may be offered, for example to select the required capacity and/or number of physical tape cartridges. A user activatable object, for example a Go button 505 is presented for the user to request to proceed using the present contents of the boxes 502, 503.

Using the GUI 501 of FIG. 5, the method described above with reference to FIGS. 7a, 7b and 7b is employed, but the determiner 2036 reports to the VTL user interface 2033 after each iteration the currently determined preferred manifest or manifest combination. The determiner 2036 also determines after each iteration the number of non-duplicate hashes in the currently determined preferred manifest combination as a proportion of the number of non-duplicate hashes in all manifests 710 to 719 (that is, the coverage) and reports these numbers and/or the proportion to the VTL user interface 2033. The VTL user interface presents some details of the virtual tape cartridges corresponding to the currently determined preferred manifest, or manifest combination, and other reported information to the user using the GUI 501. For example, as shown in FIG. 5, the coverage provided by a preferred virtual tape cartridge or preferred combinations of virtual tape cartridges is presented for each of an increasing number of virtual tape cartridges in the range selected by the user. A user activatable show tapes object 510 to 514 is presented alongside the coverage for each tape cartridge or tape cartridge combination in the range. In response to activation of a show tapes object 510 to 514, a tape cartridge identifier list is presented, identifying a virtual tape cartridge corresponding to a determined preferred manifest, or identifying virtual tape cartridges corresponding to manifests in the determined preferred combination(s) of manifests.

In alternative embodiments, manifests can simply be ranked according to levels of duplication of the chunk identifiers within each manifest, combinations of manifests not being considered, and a list of corresponding ranked logical storage units provided. However, in certain situations, for example where many manifests respectively contain significant quantities of similar data, this approach is less effective than alternative approaches that consider combinations of manifests.

The offloader 2037 is operable to respond to an offload request, for example from the VTL user interface 2033, to offload a logical storage unit to removable storage. For example, a user activatable offload tapes object 606 can be presented to a user to facilitate offload of at least one identified required virtual tape cartridge to at least one physical tape cartridge using a physical tape library or physical tape drive connected to the data storage system 1013, 1113, 1213, 2013 through the communications interface 2070. In this case, activation of the offload tapes object 606 leads to a further GUI page permitting a user to select desired physical tape cartridges and slots to receive the identified required virtual tapes 1, 2, 8, 11, 12, 15, 17, 20, and presenting a user activatable object for initiating the offload. Alternatively, a single click of the offload tapes object 606 could automatically initiate offload using preselected physical tape cartridges and slots. Similarly, a user activatable offload tapes object (not shown) could be presented by GUI 501 in a page that is presented together with the tape cartridge identifier list in response to activation of a show tapes object 510, 511, 512, 530, 514.

Alternatively, where virtual tape cartridges are routinely offloaded to physical tape cartridges using, for example, a tape library connected to the interface 2070, a further activatable object (not shown) can be provided by the GUI 501, 601 to enable a user to request that the physical tape cartridges containing selected previously offloaded virtual tape cartridges be exported by the tape library. Alternatively, a user can simply use the information presented by the GUI 501, 601 to manually identify and access required physical tape cartridges.

In some embodiments, the determination of a preferred manifest or manifest combination can be performed using reduced sets of chunk identifiers selected from the respective manifests. For example, the processing of the logical storage unit manifests can be performed using only those chunk identifiers within each manifest that have, say, the value zero assigned to their seven most significant bits, or by selecting reduced sets of chunk identifiers based on some other convenient characteristic of the chunk identifiers. Additionally or alternatively, only certain bits within each chunk identifier might be used for the processing of the logical storage unit manifests.

The or each physical tape cartridge bearing the or each offloaded preferred virtual tape cartridge is physically transported 1310 to a locality of a data storage system 1013, 1113, 1213, 2013 to be seeded. The or each virtual tape cartridge is then imported to the data storage system 1013, 1113, 1213, 2013 to be seeded using a physical tape library or physical tape drive connected to the data storage system, for example using a direct attached connection or a fast network 1015, 1115 connection.

Offloading can be performed so as to map virtual tape cartridges and physical tape cartridges on a one-to-one basis. Alternatively, where the physical tape cartridge or cartridges to be offloaded have different storage capacity to the virtual tape cartridges, more than one virtual tape cartridge may be offloaded to a physical tape cartridge, or a virtual tape cartridge may be offloaded partially to one physical tape cartridge and partially to another physical tape cartridge. It is not necessary that virtual tape cartridges used to seed a data storage system are cross referencable between the seeded data storage system and the seeding data storage system. For example, the seed data can be stored in dummy virtual tape cartridges created specifically for the purposes of seeding. As long as the seed data has been processed and stored by the receiving data storage system, the efficiency of remote replication should be increased.

Figure 8:
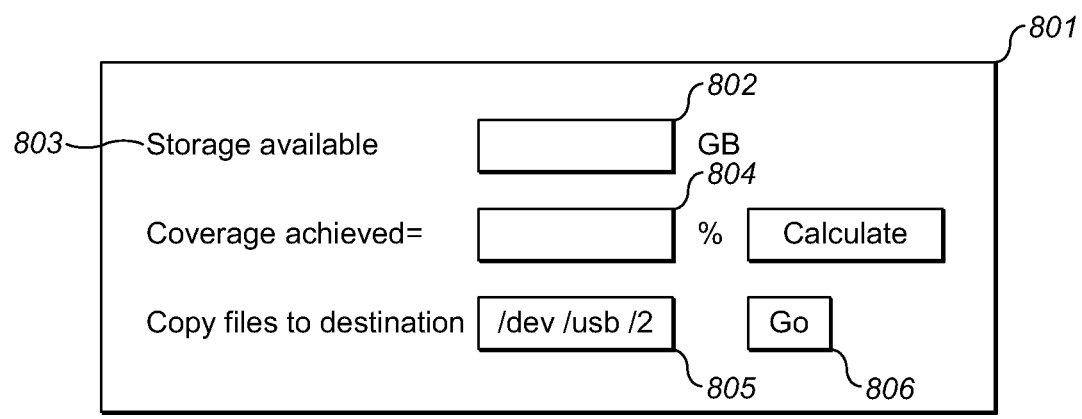
FIG. 8 shows an alternative exemplary GUI for requesting provision of removable storage bearing preferred seed data.

FIG. 8 shows an alternative exemplary GUI arrangement 801 for use with the NAS interface 2034 in a process of requesting the provision of seed data on removable storage, for example, a removable hard disk drive, a USB flash memory or other flash memory, or any other convenient type of removable storage. The GUI 801 is generated, for example, by the NAS user interface 2034. The GUI 801 has a box 802, or other mode of receiving numerical input, and a prompt 803 requesting user input into the box 802 of a desired available capacity of removable storage to be used to bear the seed data. A user activatable object, for example a calculate button 804, is presented for the user to request to proceed using the present contents of the box 802.

In response to receiving a request to proceed from a user, the NAS user interface 2034 identifies the or each file manifest 4022 in the instant file share, and requests the determiner 2036 to process the or each manifest 4022 to determine at least one preferred manifest 4022 or preferred combination of manifests according to levels of duplication of the chunk identifiers 4019 within the respective manifests 4022 or combinations. By way of example, the determiner 2036 is operable to perform a method, illustrated conceptually in FIGS. 9a, 9b and 9c, for determining at least one preferred manifest or preferred combination of manifests.

FIG. 9a shows the contents of ten file manifests 910 to 919 of a file share. Data identifiers 4019 in the form of hashes are represented in the drawings by respective letters of the alphabet, identical letters representing identical hashes. For example, manifest 910 contains five hashes ABBDN. It will be appreciated that the figures are by way of conceptual illustration only, and that in practice each manifest may contain a large number of hashes. The determiner 2036 is operable to perform a count of a number of mutually different chunk identifiers occurring within each respective manifest 910 to 919, and stores a count value for each manifest 910 to 919 in the non-duplicates column 920. The determiner 2036 also determines the number of hashes in each manifest, as shown in the size column 921 of FIG. 9a. The determiner 2036 further calculates for each manifest a comparative value, for example the ratio shown in column 922 of the non-duplicates value in column 920 to the file size value in column 921.

The resulting comparative values in column 922 are compared and the manifest, in the example of FIG. 9a manifest 919, having the highest value is selected as the currently preferred manifest, indicated by a tick in FIG. 9a. In case of a draw between manifests having equal ratio values, the drawing manifest with the largest size value in column 921 is selected. In case of a further draw, the first listed of the drawn manifests is selected. If the currently preferred manifest represents a file that reaches the input available storage capacity within a predetermined threshold, the determiner 2036 reports the currently preferred manifest as the determined preferred manifest.

If the currently preferred manifest represents a file that does not reach the input available storage capacity within the predetermined threshold, the determiner 2036 uses manifest 919 as a root manifest, and combines this root manifest with each of the remaining manifests, as illustrated in FIG. 9b. Any manifest combination, other than the current root, that is a subset of the current root is removed from the list or ignored. The resulting combinations of manifests are processed in an analogous manner to the processing of the individual manifests described above with a reference to FIG. 9a. That is, the resulting comparative values in column 922 are compared and the manifest combination, in the example of FIG. 9b manifest combination 919+917, having the highest ratio value is selected as the currently preferred manifest combination, indicated by a tick in FIG. 9b. In case of a draw between manifests having equal ratio values, the drawing manifest with the largest size value in column 921 is selected. In case of a further draw, the first listed of the drawn manifests is selected. If the currently preferred manifest combination represents files that reach the input available storage capacity within a predetermined threshold, the determiner 2036 reports the currently preferred manifest combination 919+917 as the determined preferred manifest combination. If the currently preferred manifest combination represents files that exceed the input available storage capacity, the determiner 2036 reports the previously preferred manifest or manifest combination as the determined preferred manifest or manifest combination.

If the currently preferred manifest combination represents files that do not reach the input available storage capacity within the predetermined threshold, the determiner 2036 uses the currently preferred manifest combination 917+919 as a root, and combines this root with each of the remaining manifests, as illustrated in FIG. 9c. Any manifest combination, other than the current root, that is a subset of the current root is removed from the list or ignored. The resulting combinations of manifests are processed in an analogous manner to the processing of the manifest combinations described above with reference to FIG. 9b. That is, the resulting comparative values in column 922 compared and the manifest combination, in the example of FIG. 9c manifest combination 919+917+915, is selected as a currently preferred manifest combination, indicated by a tick in FIG. 9c. In case of a draw between manifests having equal ratio values, the drawing manifest with the largest size value in column 921 is selected. In case of a further draw, the first listed of the drawn manifests is selected. If the currently preferred manifest combination represents files that reach the input available storage capacity within the predetermined threshold, or there are no comparisons left to perform, the determiner 2036 reports the currently preferred manifest combination 919+917+915 as the determined preferred manifest combination. If the currently preferred manifest combination represents files that exceed the input available storage capacity, the determiner 2036 reports the previously preferred manifest or manifest combination as the determined preferred manifest or manifest combination.

If the currently preferred manifest combination represents files that do not reach the input available storage capacity within the predetermined threshold, the determiner 2036 iterates the process described in the immediately preceding paragraph until the predetermined threshold is met or exceeded. If the currently preferred manifest combination represents files that reach the input available storage capacity within the predetermined threshold, or there are no comparisons left to perform, the determiner 2036 reports the currently preferred manifest combination 919+917+915 as the final determined preferred manifest combination. If the currently preferred manifest combination exceeds the input available storage capacity, the determiner 2036 reports the previously preferred manifest or manifest combination as the final determined preferred manifest or manifest combination. The determiner 2036 also determines the number of non-duplicate hashes in the finally determined preferred manifest combination as a proportion of the number of non-duplicate hashes in all manifests 910 to 919 and reports these numbers and/or the proportion to the NAS user interface 2034. The NAS user interface presents the reported achieved coverage information to the user using the GUI 801, for example using an information output box 804. A data input box 805 for receipt of a destination file address, together with a prompt to enter the address can be provided to facilitate transfer of the seed data corresponding to the determined preferred manifest or manifest combination to a desired removable storage destination. A user activatable object 806 can be provided to initiate offload of the finally determined seed data files to the destination file at the received destination file address.

In an alternative embodiment, a plurality of logical storage unit manifests identifying a collection of logical storage units can be copied from a data storage system 1013, 1113, 1213, 2013 to another computer system, for example a host computer system 1010, 1011, 1110, 1111, which computer system includes a determiner module, similar to the determiner 2036, for processing the manifests. The determiner module can, for example, communicate with or form part of a storage application 3062, such as a backup application. The backup application can include GUIs similar to the GUIs described above with respect to FIGS. 5, 6 and 8, for obtaining user input, for example regarding the capacity of removable storage available locally and/or over a fast communications link. Additionally or alternatively, the backup application can establish from the host 1010, 1011, 1110, 1111 or other computer system what type and capacity of removable storage is available. Following processing of the manifests at the host 1010, 1011, 1110, 1111 or other computer system, the storage application can be used to obtain the finally preferred logical storage units from the data storage system 1013, 1113, 1213, 2013, for example using a special application programming interface (API) provided for this purpose. Seed data, for example in the form of finally preferred files, can then be copied to the removable storage by the host 1010, 1011, 1110, 1111 or other computer system over the local and/or fast communications link.

Figure 10:
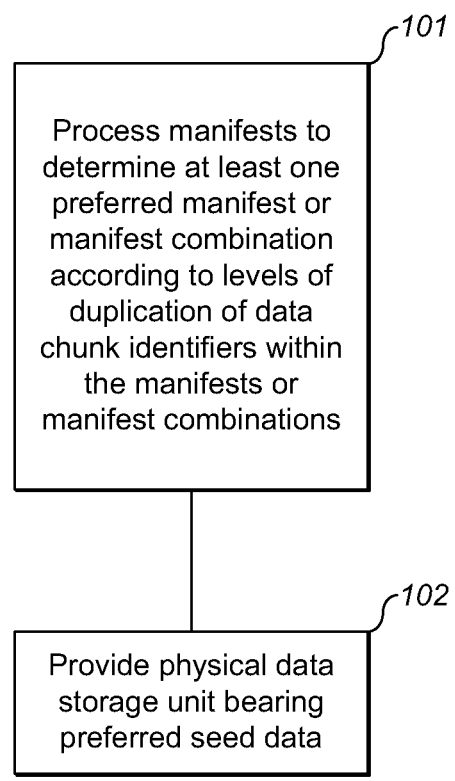
FIG. 10 is a flow diagram illustrating a method of processing manifests.

Using a deduplicating data storage system 1013, 1113, 1213, 2013 as described above a list of manifests representing respective logical storage units, for example respective virtual tape cartridges or file system shares, is identified. The manifests are processed 101 (FIG. 10), for example in a manner as described above, to determine at least one preferred manifest or preferred manifest combination according to levels of duplication of data chunk identifiers within respective manifests or preferred manifest combinations. The preferred manifest 4022 or manifest combinations comprise data identifiers 4019 that identify the stored data chunks 4018 that constitute the represented logical storage units.

Removable physical storage, for example at least one physical tape cartridge, hard disk drive, flash memory, CD, DVD or any other convenient physical storage is then provided 102 (FIG. 10), bearing the identified data chunks, for use as seed data. For example, at least one physical tape cartridge can be provided by offloading preferred virtual tape cartridges to the physical tape cartridge using a tape library or tape drive connected over a fast connection to the data storage system 1013, 1113, 1213, 2013. For example, the data storage system offload facility 2037 can be used to offload the preferred virtual tape cartridges to a physical tape cartridge in a physical tape library through the interface 2070. Alternatively, at least one physical tape cartridge can be provided by using an identified previously offloaded physical tape cartridge, for example by exporting identified physical tape cartridges from a physical tape library connected to the data storage system. As a further alternative at least one removable storage unit can be provided by the NAS interface 2034 copying preferred file shares to the at least one removable storage unit through the interface 2870. Other, still further alternatives will be apparent to the ordinarily skilled person.

The removable physical storage 2080 bearing the seed data is physically transported to the locality of a data storage system 1013, 1113, 1213, 2013 to be seeded, that is, to a location in which a high bandwidth connection can be conveniently made between the removable storage 2080 and the data storage system. The data storage system 1013, 1113, 1213, 2013 to be seeded receives the preferred logical storage unit seed data. For example import functionality of the VTL interface 2033 can be used to import the contents of the at least one physical seed tape cartridge 2080 using a physical tape library in communication with the data storage system to be seeded. According to another example, the NAS interface 2034 can be used to copy seed data from the removable storage. By storing the seed data, non-duplicated data chunks from the seed data are stored in the data chunk store 4021 of the receiving data storage system, in accordance with the usual deduplication process applied to storage data sent to the data storage system 1013, 1113, 1213, 2013.

At least some of the embodiments described above facilitate timely and convenient transfer and storage, to a receiving deduplicated data chunk store 4021, of relevant data chunks 4018. This can be beneficial, for example when employed with systems that use relatively slow and/or relatively cheap communication links for replication of data. Using at least some of the embodiments described above, the order in which the data chunks are received and stored in the receiving data chunk store 4021 is likely to reflect the order of data chunks in future backup data, which can assist high efficiency, for example in deduplication engines that make use of data chunk order and/or locality in the matching process.

Any of the features disclosed in this specification, including the accompanying claims, abstract and drawings, and/or any of the steps of any method or process so disclosed, may be combined in any combination, except combinations were the sum of such features and/or steps are mutually exclusive. Each feature disclosed in this specification, including the accompanying claims, abstract and drawings, may be replaced by alternative features serving the same, equivalent or similar purpose, unless expressly stated otherwise. Thus, unless expressly stated otherwise, each feature disclosed is one example only of a generic series of equivalent or similar features.

The invention is not restricted to the details of any foregoing embodiments. The claim should not be construed to cover merely the foregoing embodiments, but also any embodiments which fall within the scope of the claims, including alternative algorithms for determining the preferred manifest or manifest combination, some of which will be readily apparent to the ordinarily skilled person reading the foregoing. The invention extends to any novel one, or any novel combination, of the features disclosed in this specification, including the accompanying claims, abstract and drawings, or to any novel one, or any novel combination, of the steps of any method or process so disclosed.

Embodiments within the scope of the present invention also include at least one computer readable medium for having above described computer executable program instructions or data structures stored thereon, also known as computer software. Such computer readable medium can be any suitable medium accessible by a general purpose or special purpose computer such as host computer system 1010, 1011, 1110, 1111 or data storage system 1013, 1113, 1213, 2013. Computer executable instructions may comprise, for example, instructions and data which cause a general purpose computer, special purpose computer, or other special purpose processing device to perform a certain function or group of functions. The software of the present invention can be implemented in several different ways. The implementation of the software is not limiting on the invention.

The invention claimed is:

1. A method to provide seed data from a deduplicating data storage system to seed a further deduplicating data storage system using removable storage, the method comprising:
   using a computer processor, processing a plurality of logical storage unit manifests, the plurality of manifests comprising respective pluralities of chunk identifiers identifying data chunks in a deduplicated data chunk store, where each of the plurality of manifests is associated with a corresponding level of duplication of the chunk identifiers in the respective manifest, the processing including selecting at least one preferred manifest or preferred combination of manifests from among the plurality of manifests based on the levels of duplication of the chunk identifiers within the respective manifests; and
   providing removable physical storage bearing preferred seed data corresponding to data chunks identified by the at least one preferred manifest or preferred combination of manifests.

2. The method of claim 1, wherein providing the removable physical storage comprises at least one of:
   initiating offload to the removable physical storage of at least one logical storage unit corresponding to data chunks identified by the selected at least one preferred manifest or preferred combination of manifests, or
   initiating export from a physical storage unit library of at least one physical storage unit corresponding to data chunks identified by the selected at least one preferred manifest or preferred combination of manifests.

3. The method of claim 1, wherein processing the plurality of manifests comprises:
   performing counts of mutually different chunk identifiers occurring within respective said manifests, where the counts are based on the respective levels of duplication of the chunk identifiers within respective said manifests;
   obtaining respective resulting values using the counts; and
   determining the at least one preferred manifest or preferred combination of manifests using the resulting values.

4. The method of claim 3, further comprising:
   receiving data relating to a desired number and/or capacity of removable storage;
   comparing the resulting values to determine a preferred manifest;
   combining data chunks from the preferred manifest with data chunks from other remaining manifests and comparing the resulting values in respect of the combination of the manifests to determine a preferred manifest combination;
   combining the preferred manifest combination with data chunks from other remaining manifests and comparing the resulting values in respect of the further combination of the manifests to determine a subsequent preferred manifest combination.

5. The method of claim 3, wherein the resulting values comprise the counts.

6. The method of claim 3, wherein the resulting values comprise respective comparative resulting values obtained using the counts and corresponding sizes of file system entities represented by the respective manifests.

7. The method of claim 1, further comprising ranking the plurality of manifests from most preferred to least preferred based on the corresponding levels of duplication.

8. The method of claim 1, further comprising using the selecting of the at least one preferred manifest or preferred combination of manifests to select at least one logical storage unit for transfer to the removable physical storage.

9. The method of claim 1, wherein the selecting is made using reduced sets of chunk identifiers selected from the respective manifests or respective combinations of manifests.

10. The method of claim 1, wherein the logical storage unit manifests represent respective virtual tapes, and the removable physical storage comprises at least one physical tape cartridge bearing at least one respective preferred virtual tape or part thereof.

11. The method of claim 1, further comprising transporting the provided removable physical storage to a locality of the further deduplicating data storage system, and loading the seed data into the further deduplicating data storage system from the removable physical storage to seed a deduplicated data chunk store of the further deduplicating data storage system.

12. A non-transitory computer readable medium having stored thereon computer program instructions that, when executed by a computer system, cause the computer system to provide seed data from a deduplicating data storage system to seed a further deduplicating data storage system using removable storage, execution of said instructions causing said computer system to:
  process a plurality of logical storage unit manifests, the plurality of manifests comprising respective pluralities of chunk identifiers identifying data chunks in a deduplicated data chunk store, where each of the plurality of manifests is associated with a corresponding level of duplication of the chunk identifiers in the respective manifest, the processing including selecting at least one preferred manifest or preferred combination of manifests from among the plurality of manifests based on the levels of duplication of the chunk identifiers within the respective manifests; and
  initiate provision of removable physical storage bearing preferred seed data corresponding to data chunks identified by the at least one preferred manifest or preferred combination of manifests.

13. The computer readable medium of claim 12, wherein the computer program instructions, when executed, further cause the computer system to at least one of:
  initiate offload to the removable plural storage of at least one logical storage unit corresponding to data chunks identified by the selected at least one preferred manifest or preferred combination of manifests, or
  initiate export from a physical storage unit library of at least one physical storage unit corresponding to data chunks identified by the selected at least one preferred manifest or preferred combination of manifests.

14. The computer readable medium of claim 12, wherein the computer program instructions, when executed further cause the computer system to:
  perform counts of mutually different chunk identifiers occurring within respective said manifests, where the counts are based on the respective levels of duplication of the chunk identifiers within respective said manifests;
  obtain respective resulting values using the counts; and
  determine the at least one preferred manifest or preferred combination of manifests using the resulting values.

15. The computer readable medium of claim 12, wherein the computer program instructions, when executed further cause the computer system to:
  generate a user interface to request the input of data relating to a desired number and/or capacity of removable storage, present data relating to the at least one preferred manifest or preferred combination of manifests, and request further user input to select for transfer to the removable physical storage at least one logical storage unit corresponding to the at least one preferred manifest or preferred combination of manifests; and
  initiate offload to the removable physical storage of the selected at least one logical storage unit.

16. A computer system operable to provide seed data from a deduplicating data storage system to seed a further deduplicating storage system using removable storage, said computer system comprising:
  at least one processor to:
    process a plurality of logical storage unit manifests, the plurality of manifests comprising respective pluralities of chunk identifiers identifying data chunks in a deduplicated data chunk store, where each of the plurality of manifests is associated with a corresponding level of duplication of the chunk identifiers in the respective manifest, the processing including selecting at least one preferred manifest or preferred combination of manifests from among the plurality of manifests based on the levels of duplication of the chunk identifiers within the respective manifests; and
    initiate provision, on removable physical storage, of preferred seed data corresponding to data chunks identified by the at least one preferred manifest or preferred combination of manifests.

17. The computer system of claim 16, wherein the at least one processor is to initiate provision of said preferred seed data by at least one of:
  offloading to the removable physical storage at least one logical storage unit corresponding to data chunks identified by the selected at least one preferred manifest or preferred combination of manifests, or
  exporting from a physical storage unit library at least one physical storage unit corresponding to data chunks identified by the determined at least one preferred manifest or preferred combination of manifests.

18. The computer system of claim 16, wherein the at least one processor is further to:
  perform counts of mutually different chunk identifiers occurring within respective said manifests, where the counts are based on the respective levels of duplication of the chunk identifiers within respective said manifests;
  obtain respective resulting values using the counts; and
  determine the at least one preferred manifest or preferred combination of manifests using the resulting values.

19. The computer system of claim 16, further comprising a user interface to:
  request input of data relating to a desired number and/or capacity of removable storage, present data relating to the at least one preferred manifest or preferred combination of manifests, and request further user input to select for transfer to the removable physical storage at least one logical storage unit corresponding to the at least one preferred manifest or preferred combination of manifests; and
  initiate offload to the removable physical storage of the selected at least one logical storage unit.

20. The computer system of claim 16, wherein the at least one processor is to further:
  process received data into data chunks;
  generate chunk identifiers identifying the respective data chunks, and store manifests containing the chunk identifiers to a manifest store, the stored manifests representing respective logical storage units;
  compare incoming chunk identifiers against chunk identifiers in the stored manifests and store non-matched incoming data chunks to the deduplicated data chunk store; and
  transfer, from the deduplicated data chunk store to the removable physical storage, data chunks corresponding to the at least one preferred manifest or preferred combination of manifests.

* * * * *

UNITED STATES PATENT AND TRADEMARK OFFICE
CERTIFICATE OF CORRECTION

| | | |
|---|---|---|
| PATENT NO. | : 8,566,519 B2 | Page 1 of 1 |
| APPLICATION NO. | : 12/833594 | |
| DATED | : October 22, 2013 | |
| INVENTOR(S) | : Matthew Russell Lay et al. | |

It is certified that error appears in the above-identified patent and that said Letters Patent is hereby corrected as shown below:

In the Claims:

In column 17, line 51, in Claim 15, delete "request the" and insert -- request --, therefor.

Signed and Sealed this

Eleventh Day of February, 2014

Michelle K. Lee
*Deputy Director of the United States Patent and Trademark Office*